US011121990B2

(12) United States Patent
Mukherjee et al.

(10) Patent No.: US 11,121,990 B2
(45) Date of Patent: Sep. 14, 2021

(54) METHODS AND SYSTEMS FOR OPTIMIZING DELIVERY OF ELECTRONIC COMMUNICATIONS

(71) Applicant: INTERNATIONAL BUSINESS MACHINES CORPORATION, Armonk, NY (US)

(72) Inventors: Maharaj Mukherjee, Poughkeepsie, NY (US); Jonathan Lenchner, North Salem, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 112 days.

(21) Appl. No.: 15/850,553

(22) Filed: Dec. 21, 2017

(65) Prior Publication Data

US 2019/0199660 A1    Jun. 27, 2019

(51) Int. Cl.
| | |
|---|---|
| *G06F 15/16* | (2006.01) |
| *H04L 12/58* | (2006.01) |
| *H04L 29/08* | (2006.01) |
| *G06Q 10/10* | (2012.01) |

(52) U.S. Cl.
CPC ......... *H04L 51/046* (2013.01); *G06Q 10/107* (2013.01); *H04L 51/14* (2013.01); *H04L 67/18* (2013.01)

(58) Field of Classification Search
CPC ................................ H04W 4/12; H04L 51/10
See application file for complete search history.

(56) References Cited

U.S. PATENT DOCUMENTS

| | | | | |
|---|---|---|---|---|
| 7,313,106 B2 * | 12/2007 | Steinberg | ................ | H04L 29/06 370/328 |
| 7,356,567 B2 * | 4/2008 | Odell | ................... | G06Q 10/107 709/206 |
| 7,394,761 B2 * | 7/2008 | Foster | ................. | H04L 12/5692 370/227 |
| 9,271,111 B2 * | 2/2016 | Blanksteen | ............. | H04W 4/02 |
| 9,319,856 B1 * | 4/2016 | Riggs | ................... | G06Q 10/107 |
| 10,504,124 B2 * | 12/2019 | Schultz | .................. | G06Q 30/02 |
| 2005/0074107 A1 * | 4/2005 | Renner | ............ | H04M 3/42042 379/202.01 |
| 2009/0198777 A1 * | 8/2009 | LaFreniere | ............. | H04L 51/36 709/206 |
| 2009/0271486 A1 | 10/2009 | Ligh et al. | | |
| 2015/0019654 A1 * | 1/2015 | Wheeler | ................ | H04L 51/24 709/206 |

(Continued)

*Primary Examiner* — Umar Cheema
*Assistant Examiner* — Tesfu N Mekonen
(74) *Attorney, Agent, or Firm* — Griffiths & Seaton PLLC

(57) ABSTRACT

Embodiments for managing electronic communications by one or more processors are described. A status for each of a plurality of computing nodes associated with a user is computed. The status for each of the plurality of computing nodes is indicative of a predicted delay between an electronic communication being sent to the user through the respective computing node and the electronic communication being perceived by the user. One of the plurality of computing nodes is selected based on the computed statuses of the plurality of computing nodes. A signal representative of the selected one of the plurality of computing nodes is generated.

12 Claims, 5 Drawing Sheets

(56) References Cited

U.S. PATENT DOCUMENTS

| | | | |
|---|---|---|---|
| 2015/0334071 A1* | 11/2015 | Schlesinger | H04L 65/1069 |
| | | | 455/412.2 |
| 2015/0341290 A1* | 11/2015 | Cherifi | H04L 51/043 |
| | | | 709/206 |
| 2016/0066273 A1* | 3/2016 | Prats | H04W 52/0229 |
| | | | 370/311 |
| 2016/0173422 A1* | 6/2016 | Kidron | G06Q 10/107 |
| | | | 705/7.19 |
| 2017/0300977 A1* | 10/2017 | Warner | G06Q 30/0271 |
| 2018/0160256 A1* | 6/2018 | Khanduri | H04W 76/14 |

* cited by examiner

METHODS AND SYSTEMS FOR OPTIMIZING DELIVERY OF ELECTRONIC COMMUNICATIONS

BACKGROUND OF THE INVENTION

Field of the Invention

The present invention relates in general to computing systems, and more particularly, to various embodiments for managing electronic communications to, for example, optimize the delivery thereof.

Description of the Related Art

In recent years, computing devices, such as mobile electronic devices or mobile devices (e.g., cellular/mobile/smartphones, personal digital assistants (PDAs), and tablets, etc.), have become widely used to the point that many people now have such a device with them at all times. These devices are able to assist users in a multitude of ways in their daily lives, such as internet access, scheduling, entertainment, and particularly communication.

However, given that many people have multiple devices and/or use the devices in multiple ways, it is sometimes difficult to know the best and/or most efficient manner to contact them. For example, one may attempt to contact an individual by calling them on his/her mobile phone, but there is no way of knowing whether or not the recipient is near his/her phone and/or available to talk at that time. Similarly, one may attempt to send a written/text message via, for example, email or a social media platform, but the recipient may not access his/her account for hours, perhaps even days, after the message is sent.

SUMMARY OF THE INVENTION

Various embodiments for managing electronic communications by one or more processors are described. In one embodiment, by way of example only, a method for managing electronic communications, again by one or more processors, is provided. A status for each of a plurality of computing nodes associated with a user is computed. The status for each of the plurality of computing nodes is indicative of a predicted delay between an electronic communication being sent to the user through the respective computing node and the electronic communication being perceived by the user. One of the plurality of computing nodes is selected based on the computed statuses of the plurality of computing nodes. A signal representative of the selected one of the plurality of computing nodes is generated.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
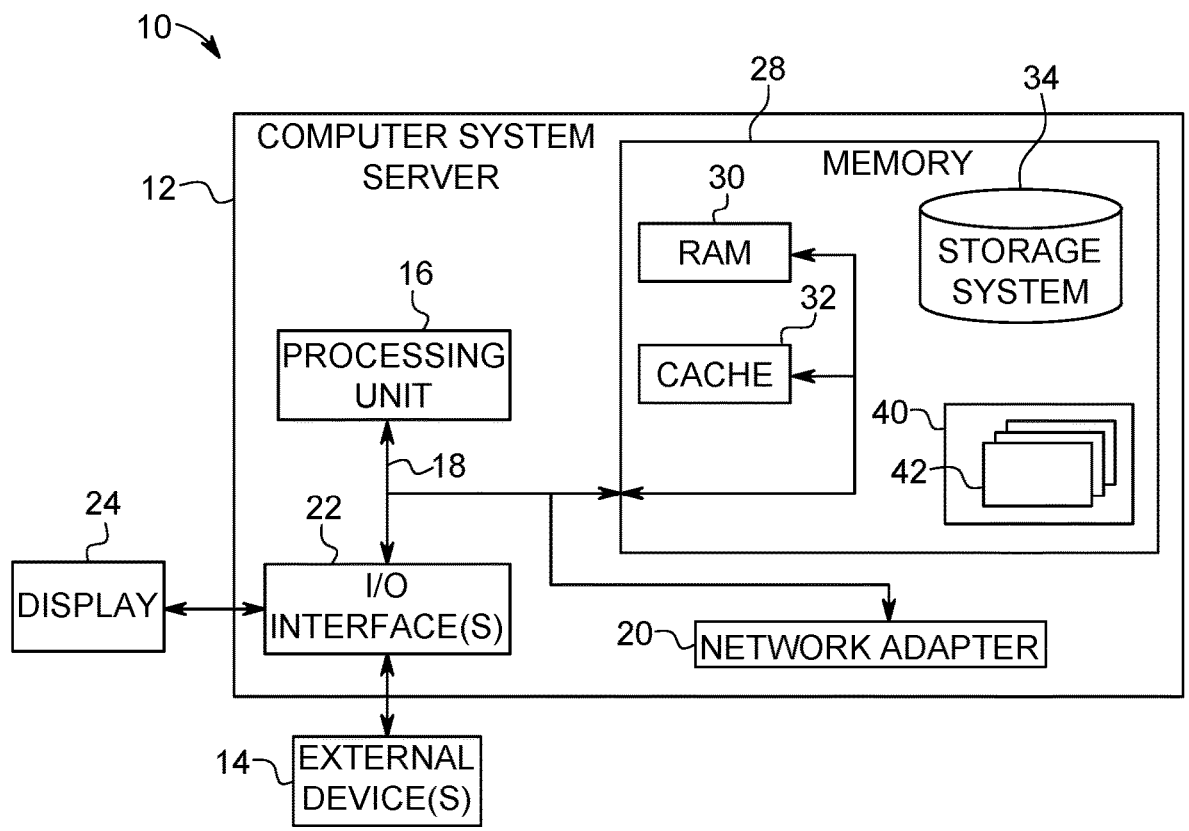
FIG. 1 is a block diagram depicting an exemplary computing node according to an embodiment of the present invention.

As discussed above, computing devices, such as mobile electronic devices or mobile devices (e.g., cellular/mobile/smartphones, personal digital assistants (PDAs), and tablets, etc.), have become widely used to the point that many people now have such a device with them at all times. These devices are able to assist users is a multitude of ways in their daily lives, such as internet access, scheduling, entertainment, and particularly communication. However, given that many people have multiple devices and/or use the devices in multiple ways, it is sometimes difficult to know the best and/or most efficient manner to contact them. This may particularly be an issue in urgent circumstances, such as important business matters and emergencies.

As an example, consider a scenario in which one individual is attempting to contact another regarding an important matter by calling them on their mobile phone. At the time the call is made, there is typically no way for the caller to know whether or not the recipient will answer the call. For example, the recipient may not have his/her mobile phone on/with them, be in an area (or situation) where talking on a phone is not allowed and/or is inappropriate and/or not be available to talk at that time, or generally prefer to receive messages in other ways, such as text messaging.

As another example, if one attempts to contact the recipient via a written message, such as through email or a social media platform, there is typically no way for the sender to know whether or not the recipient will receive and/or read the message in the near future. That is, the recipient may not access his/her email or social media account for quite some time (e.g., hours, perhaps even days) after the message is sent.

To address these needs, some embodiments described herein provide methods and systems for managing electronic communications in such a way as to optimize the delivery of a message (or multiple messages) so that the recipient may perceive (e.g., receive and/or somehow acknowledge) the message as quickly as possible.

According to some of the embodiments described herein, this is accomplished by, for example, monitoring and/or detecting the activity of various "computing nodes" associated with the intended recipient of the message. The detected activity of the various nodes is used to compute (or calculate or determine) a "status" for each of the nodes, which is indicative of a predicted (or estimated) delay between an electronic communication being sent to the user through the respective computing node and the electronic communication being perceived by the user. The statuses of the various nodes are then used to select one of the nodes as the "best"

(i.e., most efficient and/or fastest) manner (or computing node) in which to contact the recipient.

The computing of the statuses of the nodes may be performed in response to a request being received to send an electronic message (e.g., written/text message, phone call, etc.) to a user, or query being received regarding the "best" (i.e., fastest, most efficient, etc.) manner (or computing node) to contact the user (or send a message to the user). Alternatively, the activity/statuses of the computing nodes may be continuously monitored/updated so that when such requests/queries are received, the message may be immediately sent to the selected node and/or an indication of the selected node may be sent.

It should be understood that as used herein, the term "computing node" (or simply "node") may refer to a computing device, such as a mobile electronic device or a desktop computer, and/or an application, such an email application, social media application, a web browser, etc., that is associated with the intended recipient of the message. In other words, as used herein, examples of computing nodes include, for example, mobile phones, tablet devices, desktop computers or workstations that are owned and/or otherwise associated with the intended recipients of the messages (or users), and/or various applications that are utilized by the intended recipients, perhaps using the same computing devices associated with the intended recipients.

As alluded to above, and described in greater detail below, the computing of the statuses of the nodes may refer to any sort of "scoring" or "grading" of the nodes that may indicate how quickly the intended recipient of the message will perceive (e.g., receive and/or accept) the message if it is sent using that node. Exemplary aspects of node operation that may be used to compute the status thereof may include, for example, the types of computing devices associated with (e.g., owned by) the recipient, the proximity of the devices to each other, recent relative motion of the devices, the recipient usage habits (e.g., when the devices are in close proximity to each other), and other recent activity (e.g., most recent log on, keyboard or mouse usage, etc.). In some embodiments, the statuses of the nodes are computed after a request to send an electronic message to the recipient is received. However, in some embodiments, the various nodes associated with the recipient (or user) may be continuously monitored such that when a request to send a message to the recipient is received, the message is sent to the selected node immediately.

In some embodiments, the electronic message is (initially) only sent to one of the computing nodes (i.e., the selected node). If/when the recipient perceives (receives, opens, reads, etc.) the message, an indication may be provided to the sender, alerting them that the recipient has somehow acknowledged receipt of the message. However, in some embodiments, in the event that the recipient does not somehow acknowledge receipt of the message (i.e., indicating that the recipient has not actually seen/read/listened to the message), a second computing node may be selected, and an attempt to send the message to the recipient via the second node may be made. This process may be continued until the recipient acknowledges receipt of the message. That is, in some embodiments, the methods and/or systems described herein iteratively attempt to send the message(s) to the next most likely device and/or application through which the recipient will actually receive/acknowledge the message.

In some embodiments, recipients are provided with the ability to enable and/or disable the various functionalities described herein with respect to some, or all, of his/her computing nodes. That is, recipients may be provided with a manner in which to prevent senders being able to know and/or utilize the selected computing node as described herein. Similarly, recipients may be provided with a manner to only allow particular senders (e.g., family, friends, etc.) to know and/or utilize the selected computing node as described herein.

In particular, in some embodiments, a method for managing electronic communications is provided. A status for each of a plurality of computing nodes associated with a user is computed. The status for each of the plurality of computing nodes is indicative of a predicted delay between an electronic communication being sent to the user through the respective computing node and the electronic communication being perceived by the user. One of the plurality of computing nodes is selected based on the computed statuses of the plurality of computing nodes. A signal representative of the selected one of the plurality of computing nodes is generated.

The plurality of computing nodes may include at least one computing device, at least one application, or a combination thereof. If the plurality of computing nodes includes at least one application, the computing of the status of each of the plurality of computing nodes may include detecting recent user activity on the at least one application. If the plurality of computing nodes includes at least one computing device, the computing of the status of each of the plurality of computing nodes may include detecting at least one of recent user utilization of the at least one computing device, a location of the at least one computing device, a proximity of the at least one computing device with another computing device, or a combination thereof.

A request to send an electronic communication to the user may be received. The receiving of the request may occur before or after the computing of the status for each of the plurality of computing nodes associated with the user.

An electronic communication may be caused to be sent to the selected one of the plurality of computing nodes. If no indication of perception of the electronic message by the user is received, a second of the plurality of computing nodes may be selected based on the computed statuses of the plurality of computing nodes. The electronic communication may be caused to be sent to the second of the plurality of computing nodes.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
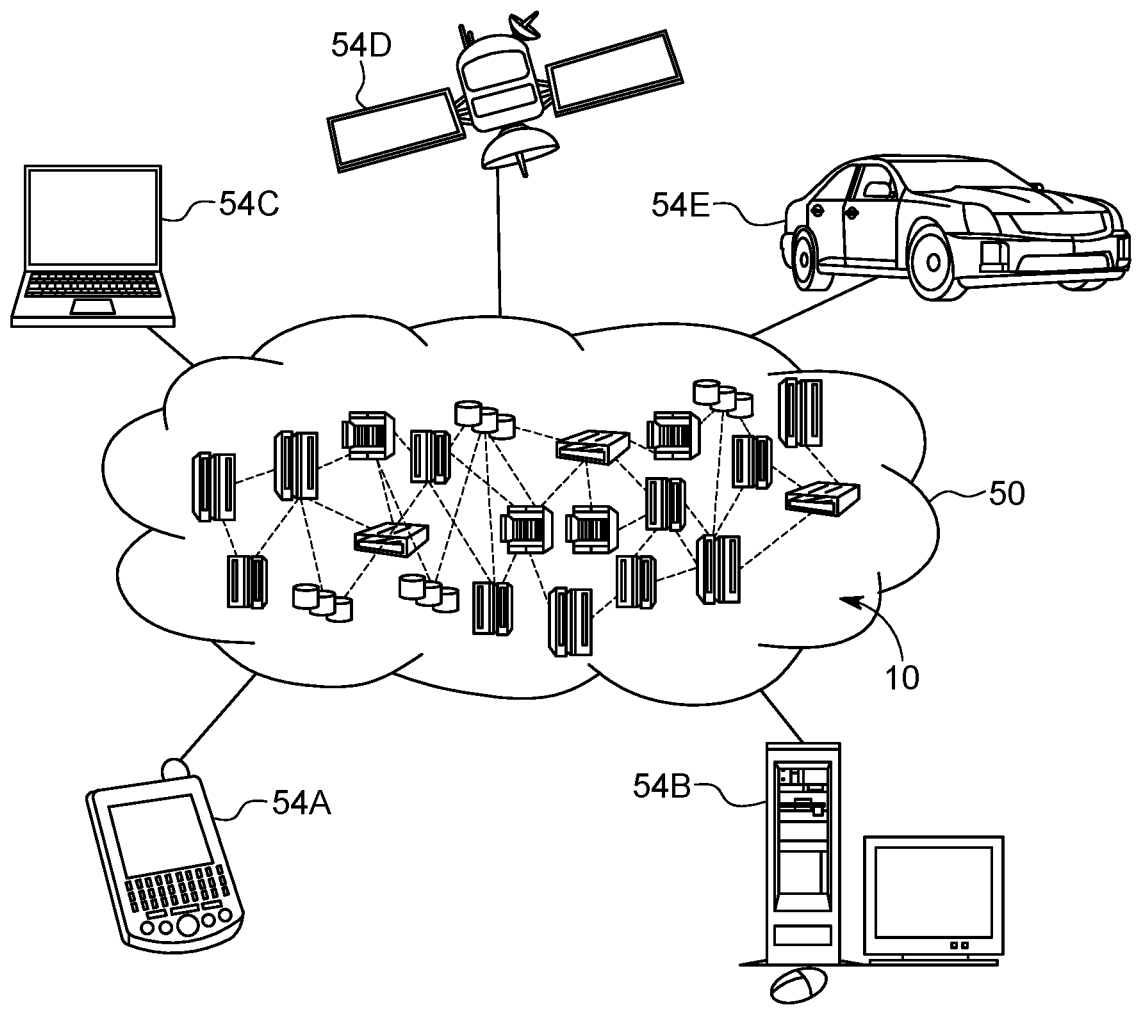
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular telephone or PDA 54A, desktop computer 54B, and/or laptop computer 54C, satellites (e.g., GPS satellites) 54D, and vehicles (e.g., automobiles, aircraft, watercraft, etc.) 54E, may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
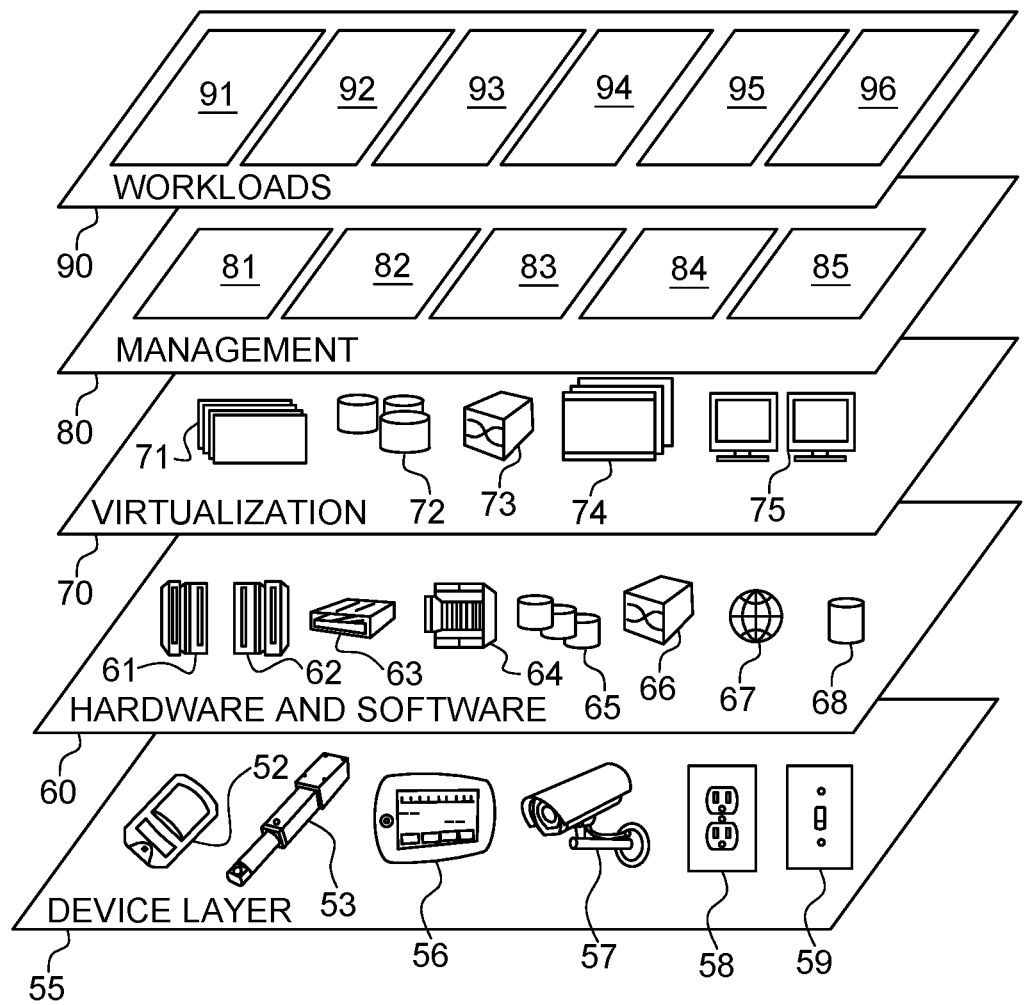
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing electronic communications as described herein. One of ordinary skill in the art will appreciate that the workloads and functions 96 for managing electronic communications may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, some embodiments described herein provide methods and systems for managing electronic communications in such a way as to optimize the delivery of a message (or multiple messages) so that the recipient may receive and/or somehow acknowledge receipt of the message as quickly as possible. In some embodiments, the methods and systems include a data collection aspect in which information regarding various computing nodes (e.g., computing devices and/or applications) associated with the intended recipient is collected and/or the activity, operation, etc. of the various computing nodes is monitored. This information is used to compute a status for each of the nodes. The computed statuses are then used to select one of the nodes to be utilized for delivering the message to the recipient (e.g., the node that is likely to achieve the fastest receipt/acknowledgement of the message by the recipient). A signal representative of the selected node is then generated. For example, in some embodiments, an electronic message is then sent to the selected node. In some embodiments, if no acknowledgment of receipt of the message is received (or indicated), a second of the computing nodes may be selected to attempt another delivery process.

Figure 4:
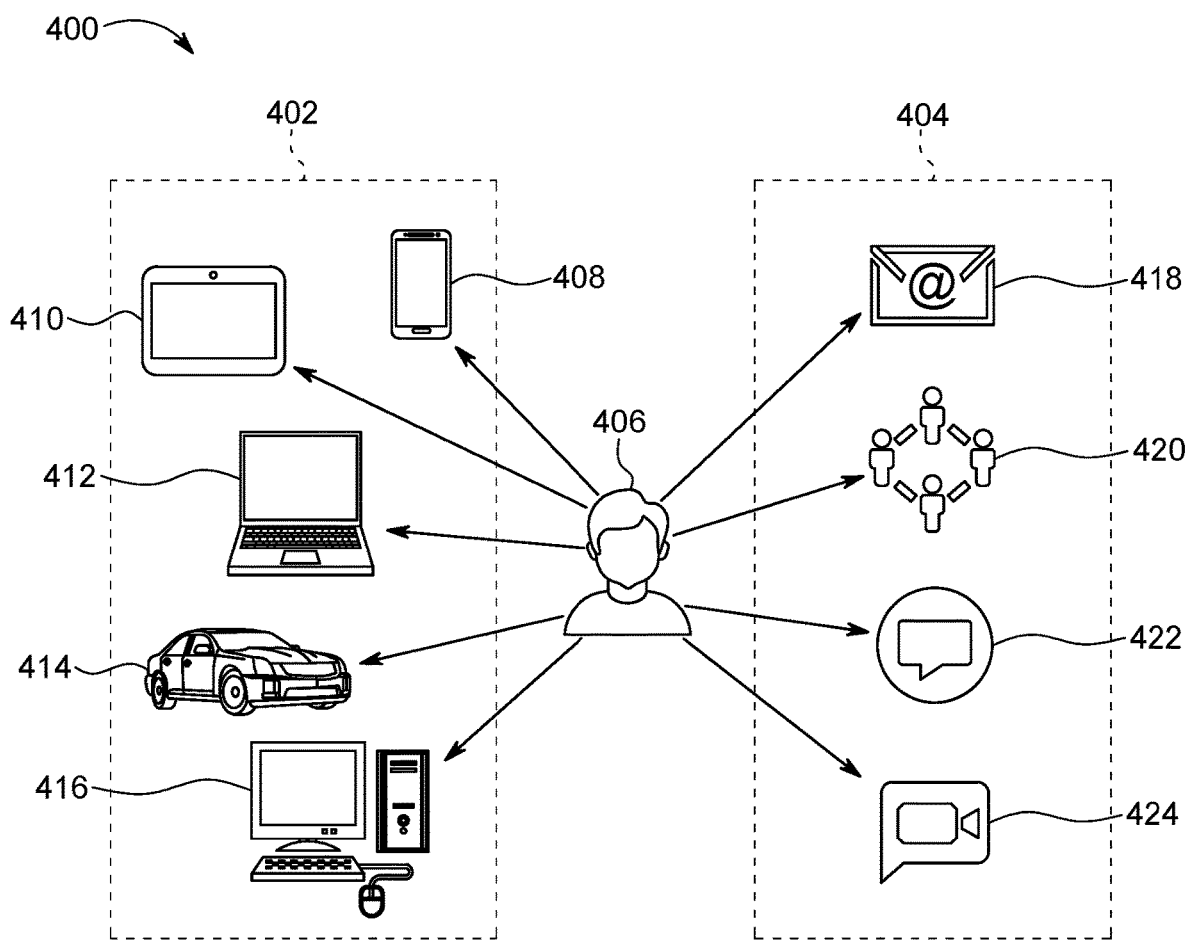
FIG. 4 is a block diagram example computing environment according to an embodiment of the present invention.

Referring now to FIG. 4, an exemplary computing environment (or system) 400 is shown. The environment 400 includes multiple computing nodes 402 and 404 that are associated with a user (e.g., an individual) 406. That is, the computing nodes 402 and 404 include computing devices and/or applications that are owned and/or used by the user 406. In the depicted embodiment, computing nodes 402 correspond to various computing devices. In particular, computing nodes 402 include a mobile phone 408, a tablet device 410, a laptop computer 412, a vehicular computing system (e.g., a computing system integrated into an automobile) 414, and a desktop computer (or PC) 416. Computing nodes 404 correspond to various applications. In particular, computing nodes 404 include an email application 418, a social media application 420, a messaging application 422, and a video conferencing application 424. It should be noted that although applications 418-424 are shown separate from devices 408-416, in some embodiments, at least some of the applications 418-424 may be installed on and/or utilized by the user 406 through any of the devices 408-416. In this manner, it should be understood that as used herein, a computing node (or node) may refer to the use of a particular application on a particular device (e.g., the use of the social media application 420 on the tablet device 410).

According to some aspects described herein, a status (or status score) for each of (or at least some of) the computing nodes 402 and 404 is computed (or calculated or determined). The status may be based on any information or data collected from and/or associated with the computing nodes 402 and 404, which may indicate how quickly the intended recipient (e.g., the user 406) of an electronic message (e.g., text message, phone call, etc.) will perceive (e.g., receive, accept, acknowledge, etc.) the receipt of a message (e.g., read a text message, listen to a voicemail, etc.) sent to/through that particular computing node. In other words, the manner in which the statuses (or status scores) of the computing nodes are computed may be configured in such a way as to facilitate the selecting of one of the nodes as the "best" manner to send the electronic message to the recipient (e.g., the fastest manner and/or the manner which will result in the least amount of delay between the message being sent and received and/or acknowledged by the recipient).

Exemplary aspects of node operation that may be used to compute the status thereof may include, for example, utilization of application and/or devices, in addition to those described above. For example, with respect to application utilization, if the recipient (or user) has recently used a particular application, such as email application 418, such activity may indicate that the recipient is situated such that he/she will notice and immediately open a new email. However, depending on the usage habits of the recipient, recent utilization of particular applications may indicate that he/she will not use that application again in the near future (e.g., the recipient only checks his/her email once a day).

With respect to device utilization, if the recipient has recently used one or more of his/her devices, such as a tablet, such activity may indicate that an electronic message sent to that device may be quickly received and/or acknowledged by the recipient. Device utilization may be detected or determined using, for example, a camera (and/or microphone) on the device and/or user input activity (e.g., on a keyboard, via a mouse/touchpad, etc.).

Additional exemplary aspects of node operation that may (also) be used to compute the statuses thereof may include, for example, the proximity of devices to other devices and movement and/or location of the devices (i.e., relative to one another and/or absolute). For example, with respect to the proximity of devices, ad-hoc device-to-device communication between devices may be used to determine which devices are in close proximity. For example, if an automobile key (e.g., a "smart key") is in close proximity of a mobile phone and tablet, and all three are near (or in) an automobile, such activity may indicate that the recipient is driving, and the best node to reach him/her may be placing a phone call via a phone integrated into the automobile. Similarly, if the mobile phone is determined to be near (or in) the automobile, but the smart key and the tablet are not, such activity may indicate that the recipient is not near (or in) the automobile, and the best node to reach him/her may be the tablet (e.g., email or messaging application).

With respect to the movement of devices (e.g., as determined using GPS and/or accelerometers integrated into the devices), if a particular device is determined to be moving away from the other devices associated with the recipient, such a situation may indicate that the recipient has that device on his/her person, and it may be the best node through which to send the communication. With respect to the location(s) of devices, if a particular device is in a location that may not be appropriate for particular types of communication, the electronic message may be sent in a particular form. For example, if a recipient's mobile phone is determined as being at a theater (or some other location where talking on a phone is not appropriate), the electronic communication may be sent via a text message to the recipient's mobile phone.

Additionally, in some embodiments, schedules and/or itineraries may be utilized. For example, if the recipient's schedule (or calendar) indicates that he/she will be at a meeting at a location that is different from his/her normal, everyday workplace (e.g., the office of another company), such information may be utilized in determining that the status of the user's mobile phone (i.e., as used to receive phone calls or text messages) is "higher" than that of the user's email, which is most often checked by the user at his/her office. Similarly, previous activity and/or a historical pattern of device/application/user activity may be used. For example, if the user has previously acknowledged text messages immediately when sent to his/her mobile phone at a certain time of day, on certain days, such information may be used to determine the status of the user's mobile phone (and/or text messaging application on the mobile phone).

In some embodiments, the statuses of the nodes are computed after a request to send an electronic message to the recipient is received. However, in some embodiments, the statuses of the nodes may be computed before a specific request to send an electronic message to the recipient is received. For example, the various nodes associated with the recipient (or user) may be continuously monitored such that when a request to send a message to the recipient is received, the message is sent to the selected node immediately. Also, in some embodiments, rather than a request to send an electronic message to the recipient, a query may be received regarding the best/fastest way to contact (or send a message to) the recipient (i.e., the sender may simply be inquiring about how best to contact the recipient).

Still referring to FIG. 4, after the statuses of the nodes 402 and 404 are computed (or calculated), one of the nodes 402 and 404 is selected based on the computed statuses (or status scores) of the nodes 402 and 404. That is, in at least some embodiments, the node that is selected has a computed status that indicates it is the "best" with respect to delivering the message to the recipient, as it is the node that will result in the least amount of delay in the recipient perceiving the message, as described above. In embodiments in which the statuses are calculated as a numerical value, the node with the highest score may be selected (i.e., as the highest score may be indicative of that particular node being the most efficient/fastest with respect to the recipient actually receiving and/or acknowledging the message). Alternatively, the statuses may be computed such that the lowest score is more desirable.

After one of the nodes is selected, a signal representative of the selected node is generated. For example, in embodiments in which a request has been received to send an electronic message to the recipient, the electronic message is automatically sent to the recipient via the selected computing node (e.g., via mobile phone, email, social media, etc.). In some embodiments, the message sent is customized by the sender (e.g., an email or text composed by the sender, a voice message spoken/recorded by the sender, etc.). However, in some embodiments, generic messages may be generated, which may utilize/include information about the sender. For example, a text message may generically indicate that a particular person (i.e., the sender) is trying to contact the recipient, as opposed to being a message that is specifically composed by the sender.

However, in some embodiments, the initial request made by the sender of the electronic message may not include a request to send a particular message to the recipient. Rather, the initial request may simply be in the form of a query (e.g., to a cloud-resident), requesting the best/most efficient manner (or computing node) to contact the recipient at a particular time (e.g., at the time the query is made, or at some other time). In such embodiments, the sender may receive a notification (e.g., via electronic message, such as email, text, etc.) indicating the selected computing node(s), as described above.

It should be noted that in at least some embodiments, such as those in which the electronic message is automatically sent to the selected node, the electronic message is, at least initially, only sent to the selected computing node, as opposed to sending the electronic message to multiple computing nodes. However, in some embodiments, the electronic message is sent to at least a second of the computing nodes if no acknowledgment of the recipient's receipt of the message is received. More specifically, a signal may be generated when the recipient performs an action that indicates that he/she has perceived (e.g., seen/read/listened to) the electronic message (e.g., opening an email, accessing a voicemail, etc.). This signal may result in the end of the process, at least with respect to the particular electronic message and recipient.

However, in the event that no acknowledgment indicating the recipient has perceived the electronic message is received and/or no such acknowledgment is received within a predetermined about of time (e.g., 30 seconds, a few minutes, etc.), a second computing node is selected in the same manner described above as the "next best" computing node for delivering the electronic message. That is, the second computing node may be selected based on the computed statuses of the computing nodes as the computing node (of the remaining nodes) that will result in the least amount of delay in the recipient actually receiving the message. The electronic message is then sent to the second computing node.

The process may then be repeated. That is, if no acknowledgment of receipt is received from the second computing node, a third (and subsequently, a fourth, a fifth, etc.) computing node may then be selected from the remaining computing nodes, and the electronic message may then be sent to the third computing node. In this manner, the methods and systems described may iteratively attempt to send the electronic message to the "best" of the remaining computing nodes that are associated with the intended recipient.

It should be noted that in some embodiments, recipients are provided with the ability to enable and/or disable the various functionalities described herein with respect to some, or all, of his/her computing nodes. That is, recipients may be provided with a manner in which to prevent senders being able to know and/or utilize the selected computing node as described herein. Similarly, recipients may be provided with a manner to only allow particular senders (e.g., family, friends, etc.) to know and/or utilize the selected computing node as described herein.

Figure 5:
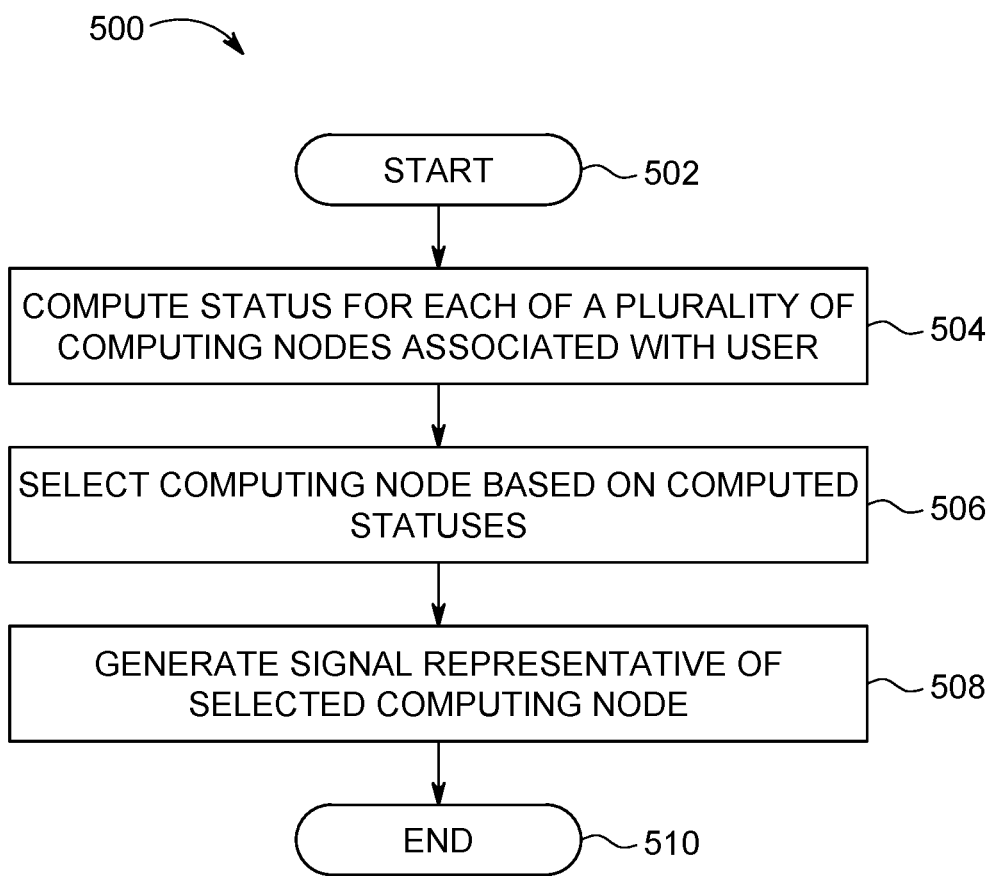
FIG. 5 is a flowchart diagram of an exemplary method for managing electronic communications according to an embodiment of the present invention.

Turning to FIG. 5, a flowchart diagram of an exemplary method 500 for managing electronic communications, in accordance with various aspects of the present invention, is provided. Method 500 begins (step 502) with, for example, a request to send an electronic communication (or message) to a recipient (or a user), or an inquiry regarding how best to contact the recipient, being received. However, as described above, in some embodiments, at least some of the steps described below may be performed before any such request is received.

A status is computed for each of a plurality of computing nodes that are associated with the recipient (or the user) (step 504). The status for each of the plurality of computing nodes is indicative of a predicted (or estimated) delay between an electronic communication being sent to the user through the respective computing node and the electronic communication being perceived by the user. As described above, the computing nodes may include at least one computing device, at least one application, or a combination thereof (i.e., at least one computing device and at least one application). The computing (or calculating or determining) of the statuses of the computing nodes may be based on information and/or data related to the computing nodes that may indicate how quickly the intended recipient of the message (e.g., the owner/operator of the computing nodes) will receive and/or accept the message if the message is sent to that node. If the plurality of computing nodes includes at least one application, the computing of the status of each of the plurality of computing nodes may include detecting recent user activity on the at least one application. If the plurality of computing nodes includes at least one computing device, the computing of the status of each of the plurality of computing nodes may include detecting at least one of recent user utilization of the at least one computing device, a location of the at least one computing device, a proximity of the at least one computing device with another computing device, or a combination thereof.

In some embodiments, one of the computing nodes is then selected based on the computed statuses (step 506). The selected computing node may be the node that is determined to be the most efficient/fastest of the nodes with respect to the recipient seeing/reading/acknowledging receipt of (or perceiving) the message, as indicated by the computed statuses of the computing nodes. In other words, the selected computing node may be considered to be the node that will likely minimize the delay between when the message is sent and when it is received and/or acknowledged by the recipient.

A signal representative of the selected computing node is then generated (step 508). For example, an electronic communication (e.g., the message requested to be sent to the recipient) may then be caused to be sent to the selected computing node. However, in embodiments in which the selected computing node is selected in response to a query regarding how best to contact the recipient (or user), an indication may be sent to the requesting party indicating the selected computing node (e.g., via email, text, etc.).

Method 500 ends (step 510) with, for example, an acknowledgment being received that the recipient has actually perceived the electronic communication (or a signal representative of such an acknowledgment being received). However, as described above, if no such acknowledgment is received, a second computing node may be selected (from the remaining computing nodes) as the "next best" computing node for sending the electronic communication to the recipient, and the electronic communication may then be sent to the second computing node. This process may be repeated multiple times (i.e., to third, fourth, etc. computing nodes) until an acknowledgment of receipt is received.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for managing electronic communications comprising:
computing a status for each of a plurality of computing devices associated with a user, wherein the status is indicative of a predicted delay between a first time at which an electronic communication is sent from an alternative computing device associated with an alternative user to a respective computing device of the plurality of computing devices or received by the respective computing device from the alternative computing device, and a second time at which the electronic communication is perceived by the user on the respective computing device notwithstanding which one of a plurality of applications, modes of communication, and communication channels are utilized by the alternative computing device to send the electronic communication, and wherein computing the status comprises detecting a static and moving proximity of each of the plurality of computing devices relative to one another using ad-hoc device-to-device communication, and relative to any additional objects or computing devices that provide context as to an activity with which the user is currently engaged;
selecting one of the plurality of computing devices based on the computed statuses of the plurality of computing devices, wherein the selecting includes determining, according to the computed statuses, which one of the plurality of computing devices, inclusive of which one of the plurality of applications, modes of communication, and communication channels, is predicted to result in a least amount of the predicted delay between the first time and the second time notwithstanding whether the selected one of the plurality of computing devices is most proximate to the user; and
causing the electronic communication to be sent from the alternative computing device to the selected one of the plurality of computing devices.

2. The method of claim 1, wherein the computing of the status of each of the plurality of computing devices further comprises detecting at least one of recent user utilization of each computing device and a location of each computing device.

3. The method of claim 1, further comprising receiving a request to send the electronic communication to the user, and wherein the receiving of the request occurs before or after the computing of the status for each of the plurality of computing devices associated with the user.

4. The method of claim 1, further comprising:
if no indication of perception of the electronic message by the user is received, selecting a second of the plurality of computing devices based on the computed statuses of the plurality of computing devices; and
causing the electronic communication to be sent to the second of the plurality of computing devices.

5. A system for managing electronic communications comprising:
at least one processor that
computes a status for each of a plurality of computing devices associated with a user, wherein the status is indicative of a predicted delay between a first time at which an electronic communication is sent from an alternative computing device associated with an alternative user to a respective computing device of the plurality of computing devices or received by the respective computing device from the alternative computing device, and a second time at which the electronic communication is perceived by the user on the respective computing device notwithstanding which one of a plurality of applications, modes of communication, and communication channels are utilized by the alternative computing device to send the electronic communication, and wherein computing the status comprises detecting a static and moving proximity of each of the plurality of computing devices relative to one another using ad-hoc device-to-device communication, and relative to any additional objects or computing devices that provide context as to an activity with which the user is currently engaged;
selects one of the plurality of computing devices based on the computed statuses of the plurality of computing devices, wherein the selecting includes determining, according to the computed statuses, which one of the plurality of computing devices, inclusive of which one of the plurality of applications, modes of communication, and communication channels, is predicted to result in a least amount of the predicted delay between the first time and the second time notwithstanding whether the selected one of the plurality of computing devices is most proximate to the user; and
causes the electronic communication to be sent from the alternative computing device to the selected one of the plurality of computing devices.

6. The system of claim 5, wherein the computing of the status of each of the plurality of computing devices further comprises detecting at least one of recent user utilization of each computing device and a location of each computing device.

7. The system of claim 5, wherein the at least one processor further receives a request to send the electronic communication to the user, and wherein the receiving of the request occurs before or after the computing of the status for each of the plurality of computing devices associated with the user.

8. The system of claim 5, wherein the at least one processor further:
if no indication of perception of the electronic message by the user is received, selects a second of the plurality of computing devices based on the computed statuses of the plurality of computing devices; and
causes the electronic communication to be sent to the second of the plurality of computing devices.

9. A computer program product for managing electronic communications by one or more processors, the computer program product comprising a non-transitory computer-readable storage medium having computer-readable program code portions stored therein, the computer-readable program code portions comprising:
an executable portion that computes a status for each of a plurality of computing devices associated with a user, wherein the status is indicative of a predicted delay between a first time at which an electronic communication is sent from an alternative computing device associated with an alternative user to a respective computing device of the plurality of computing devices or received by the respective computing device from the alternative computing device, and a second time at which the electronic communication is perceived by the user on the respective computing device notwithstanding which one of a plurality of applications, modes of communication, and communication channels are utilized by the alternative computing device to send the electronic communication, and wherein computing the status comprises detecting a static and moving proximity of each of the plurality of computing devices relative to one another using ad-hoc device-to-device communication, and relative to any additional objects or computing devices that provide context as to an activity with which the user is currently engaged;
an executable portion that selects one of the plurality of computing devices based on the computed statuses of the plurality of computing devices, wherein the selecting includes determining, according to the computed statuses, which one of the plurality of computing devices, inclusive of which one of the plurality of applications, modes of communication, and communication channels, is predicted to result in a least amount of the predicted delay between the first time and the second time notwithstanding whether the selected one of the plurality of computing devices is most proximate to the user; and
an executable portion that causes the electronic communication to be sent from the alternative computing device to the selected one of the plurality of computing devices.

10. The computer program product of claim 9, wherein the computing of the status of each of the plurality of computing devices further comprises detecting at least one of recent user utilization of each computing device and a location of each computing device.

11. The computer program product of claim 9, wherein the computer-readable program code portions further include an executable portion that receives a request to send the electronic communication to the user, and wherein the receiving of the request occurs before or after the computing of the status for each of the plurality of computing devices associated with the user.

12. The computer program product of claim 9, wherein the computer-readable program code portions further include:
an executable portion that, if no indication of perception of the electronic message by the user is received, selects a second of the plurality of computing devices based on the computed statuses of the plurality of computing devices; and
an executable portion that causes the electronic communication to be sent to the second of the plurality of computing devices.

* * * * *